(12) United States Patent
Sasaki (10) Patent No.: US 8,867,221 B2
(45) Date of Patent: Oct. 21, 2014

(54) LID OPENING AND CLOSING DEVICE AND STORAGE APPARATUS

(71) Applicant: Fujitsu Limited, Kawasaki (JP)

(72) Inventor: Yuta Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 13/733,257

(22) Filed: Jan. 3, 2013

(65) Prior Publication Data

US 2013/0200770 A1    Aug. 8, 2013

(30) Foreign Application Priority Data

Feb. 2, 2012    (JP) .................................. 2012-020907

(51) Int. Cl.

| H05K 5/00 | (2006.01) |
|---|---|
| E05D 15/00 | (2006.01) |
| A47B 96/00 | (2006.01) |
| E06B 3/34 | (2006.01) |
| G06F 1/18 | (2006.01) |
| E05F 11/22 | (2006.01) |

(52) U.S. Cl.
CPC .............. *A47B 96/00* (2013.01); *E05Y 2900/20* (2013.01); *E05D 15/00* (2013.01); *E06B 3/34* (2013.01); *G06F 1/188* (2013.01); *E05F 11/22* (2013.01)
USPC ....... 361/752; 361/753; 361/679.55; 220/200

(58) Field of Classification Search
CPC ..... H05K 9/0007; H05K 7/1427; H05K 7/16; B65D 2543/00537; B65D 25/30; B65D 43/02; B65D 21/0217; B65D 2519/00457; B65D 2519/00711; B65D 43/162; B65F 1/16

USPC ...................... 361/752, 679.55, 753; 220/200
See application file for complete search history.

(56) References Cited

U.S. PATENT DOCUMENTS

| 6,837,393 | B1 * | 1/2005 | Kuo ............................... 220/263 |
|---|---|---|---|
| 8,678,219 | B1 * | 3/2014 | Wang et al. .................... 220/211 |
| 8,766,582 | B2 * | 7/2014 | Yang et al. ..................... 318/466 |
| 2005/0258794 | A1 * | 11/2005 | Fukuizumi ..................... 318/480 |
| 2006/0108812 | A1 * | 5/2006 | Chen et al. ..................... 292/300 |

FOREIGN PATENT DOCUMENTS

| JP | 6-152158 | 5/1994 |
|---|---|---|
| JP | 6-338112 | 12/1994 |
| JP | 10-55661 | 2/1998 |

* cited by examiner

*Primary Examiner* — Robert J Hoffberg
*Assistant Examiner* — Hung Dang
(74) *Attorney, Agent, or Firm* — Staas & Halsey LLP (57) ABSTRACT

A lid opening and closing device includes a first supporting shaft, a guide surface, a second supporting shaft, an opening and closing key supported by the second supporting shaft, an arm member and a lever member, wherein when an insert is not present in a box, a lid is suspended from the first supporting shaft and covers the box and enters a closed state, and when the insert is inserted into the box through an opening, the insert causes the opening and closing key to swing in an insertion direction, an end of an arm member rises along the guide surface in synchronization with the swinging of the opening and closing key, the risen arm member lifts an end of the lever member, and the lid, to which the lever member is secured, swings around the first supporting shaft and enters an open state.

6 Claims, 9 Drawing Sheets

RELATED ART

LID OPENING AND CLOSING DEVICE AND STORAGE APPARATUS

CROSS-REFERENCE TO RELATED APPLICATION

This application is based upon and claims the benefit of priority of the prior Japanese Patent Application No. 2012-020907, filed on Feb. 2, 2012, the entire contents of which are incorporated herein by reference.

FIELD

The embodiments discussed herein are related to a lid opening and closing device and a storage apparatus.

BACKGROUND

A known information processing apparatus, which includes a plurality of slots into which, for example, power supply units and other modules may be removably inserted, enables a module stored in one slot to be replaced with the apparatus turned on.

Figure 8:
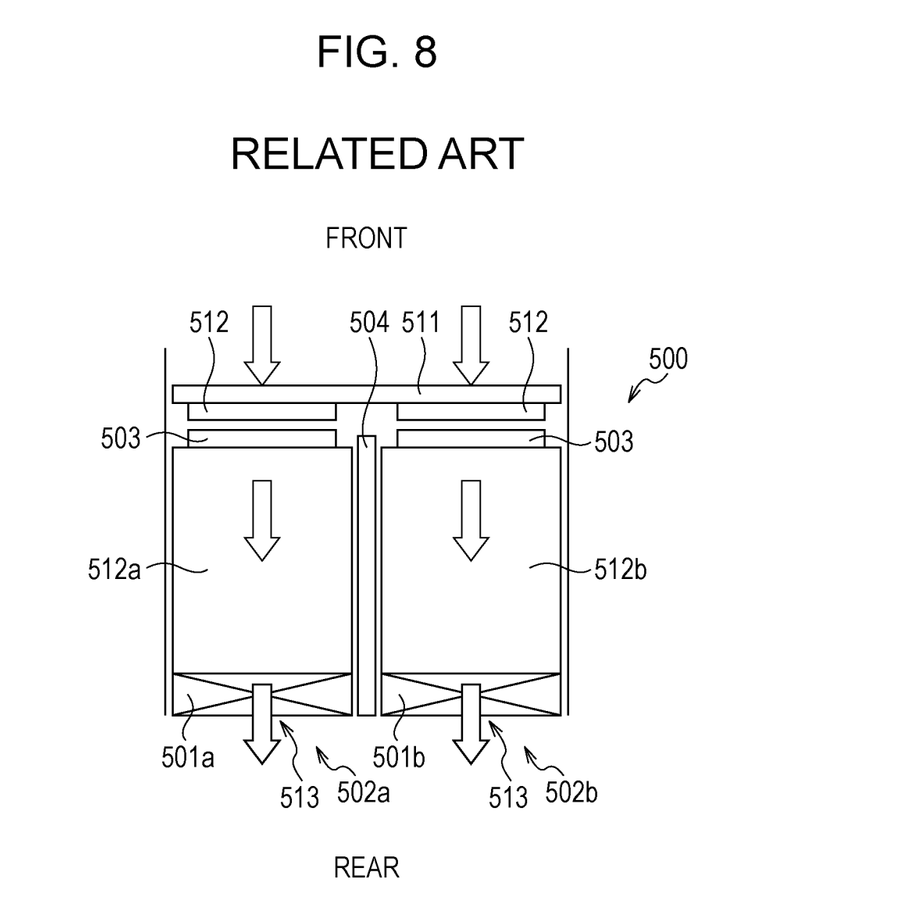
FIG. 8 is a transparent plan view that illustrates the states of the slots of a conventional information processing apparatus.
Figure 9:
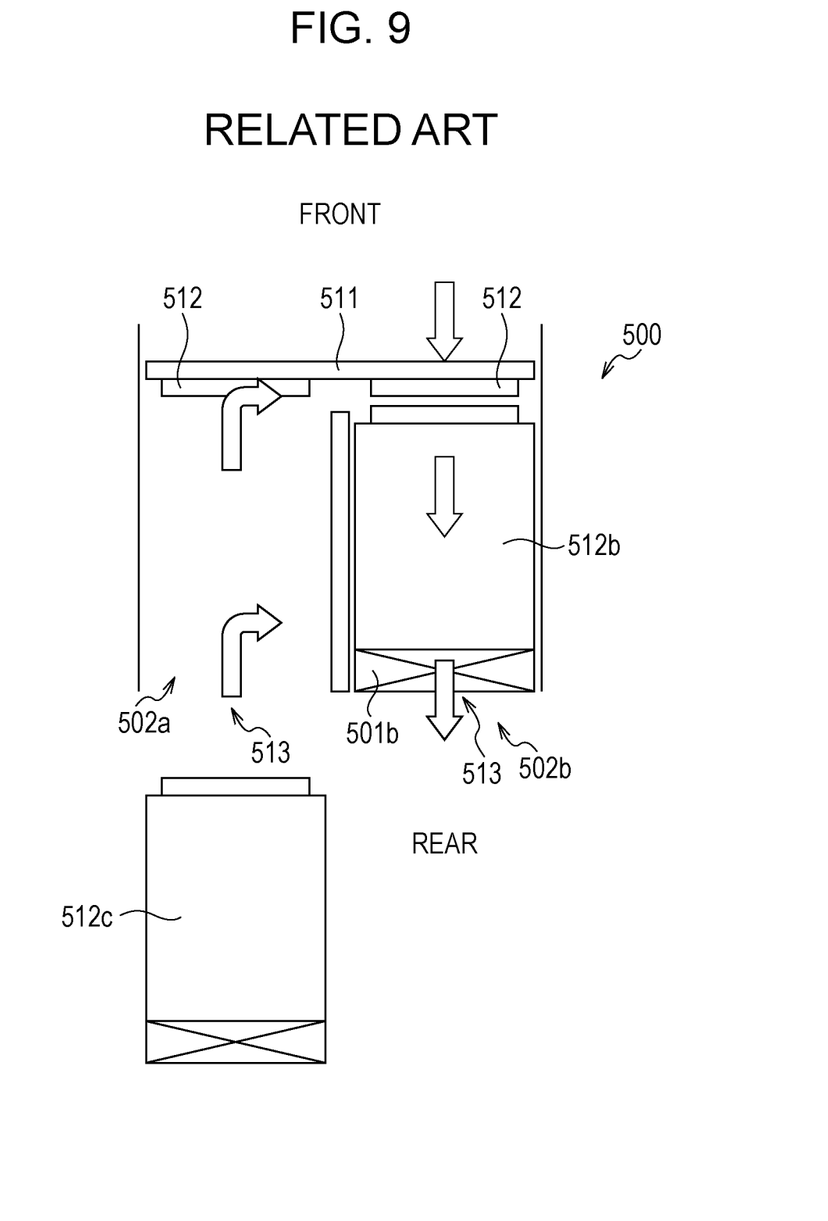
FIG. 9 is another transparent plan view that illustrates the states of the slots of the conventional information processing apparatus.

FIGS. 8 and 9 are transparent plan views that transparently illustrate the states of slots of a conventional information processing apparatus 500. In the information processing apparatus 500 in FIGS. 8 and 9, a slot 502a and a slot 502b are formed with a partition wall 504 disposed therebetween.

As illustrated in FIG. 8, a power supply unit 512a is inserted through an opening 513 formed in the rear (on the lower side in FIG. 8) of the information processing apparatus 500 into the slot 502a and a power supply unit 512b is also inserted through another opening 513 formed in the rear into the slot 502b. In the slot 502a, a connector 503 formed at one end of the power supply unit 512a is connected to a connector 512 formed on a back panel 511. In the slot 502b, another connector 503 formed at one end of the power supply unit 512b is connected to another connector 512 formed on the back panel 511.

The power supply unit 512a has a fan 501a that, when driven by the power supply unit 512a inserted into the slot 502a, supplies cooling air. The power supply unit 512b has a fan 501b that, when driven by the power supply unit 512b inserted into the slot 502b, supplies cooling air.

With the power supply unit 512a and power supply unit 512b respectively inserted into the slot 502a and slot 502b, the cooling air supplied by the fan 501a driven by the power supply unit 512a flows from the front into the power supply unit 512a and flows out of the rear, and the cooling air supplied by the fan 501b driven the power supply unit 512b similarly flows from the front into the power supply unit 512b and flows out of the rear, as illustrated in FIG. 8. Heat-generating parts included in the power supply unit 512a and power supply unit 512b are cooled by the cooling airs while the cooling airs are flowing into the power supply unit 512a and power supply unit 512b.

With the information processing apparatus 500 of this type, at the time of the active replacement of the power supply unit 512a, for example, the power supply unit 512a is pulled out through the opening 513 of the slot 502a is removed while the power supply unit 512b is supplying electric power, as illustrated in FIG. 9. Then, to install a new power supply unit 512c, it is inserted through the opening 513 into the slot 502a.

Japanese Laid-open Patent Publication No. 10-55661 is an example of related art.

At the time of the active replacement of the power supply unit 512a of the conventional information processing apparatus 500 of this type, however, the cooling air exhausted by the fan 501b, which is used to cool the power supply unit 512b, flows into the slot 502a, from which the power supply unit 512a has been removed.

The exhausted air, which has flowed into the slot 502a, is drawn by the fan 501b; for example, the exhausted air is drawn from the clearance between the back panel 511 and the partition wall 504 into the slot 502b. The exhausted air then flows into the power supply unit 512b. Since the air exhausted by the fan 501b has cooled the power supply unit 512b, the exhausted air is hot. Therefore, the exhausted gas, which has been made hot by cooling the power supply unit 512b, flows again into the power supply unit 512b, reducing the efficiency with which the power supply unit 512b is cooled.

SUMMARY

According to an aspect of the invention, a lid opening and closing device includes a lid that covers a box having an opening through which an insert is inserted, a first supporting shaft that extends horizontally and perpendicular to an insertion direction in which the insert is inserted, the first supporting shaft pivotally supporting one end of the lid, the lid being swingably suspended from the first supporting shaft, a guide surface, extending along the insertion direction, a height of which is gradually increased from the opening in the insertion direction, a second supporting shaft parallel to the first supporting shaft, the second supporting shaft being disposed nearer to the opening than the lid in the insertion direction, an opening and closing key being pivotally supported by the second supporting shaft and being swingably suspended from the second supporting shaft, an arm member, a first end of which is secured to the opening and closing key and a second end of which moves on the guide surface in synchronization with swinging of the opening and closing key, and a lever member, secured to the lid, that swings around the first supporting shaft together with the lid, one end of the lever member being disposed on an upper surface of the arm member, wherein when the insert is not present in the box, the lid is suspended from the first supporting shaft and covers the box to place the box in a closed state, and when the insert is inserted into the box through the opening, the insert causes the opening and closing key to swing in the insertion direction, the second end of the arm member rises along the guide surface in synchronization with the swinging of the opening and closing key, the risen arm member lifts the one end of the lever member, and the lid, to which the lever member is secured, swings around the first supporting shaft and enters an open state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the lid opening and closing device will be described below with reference to the drawings. The embodiments described below are only examples; there is no intention to exclude application of various variations and technologies that are not clearly described in the embodiments. That is, the embodiments of the present disclosure may be executed in various forms without departing from the intended scope of the present disclosure. The drawings are not intended to include only constituent elements illustrated therein but may include other functions and the like.

Figure 1:
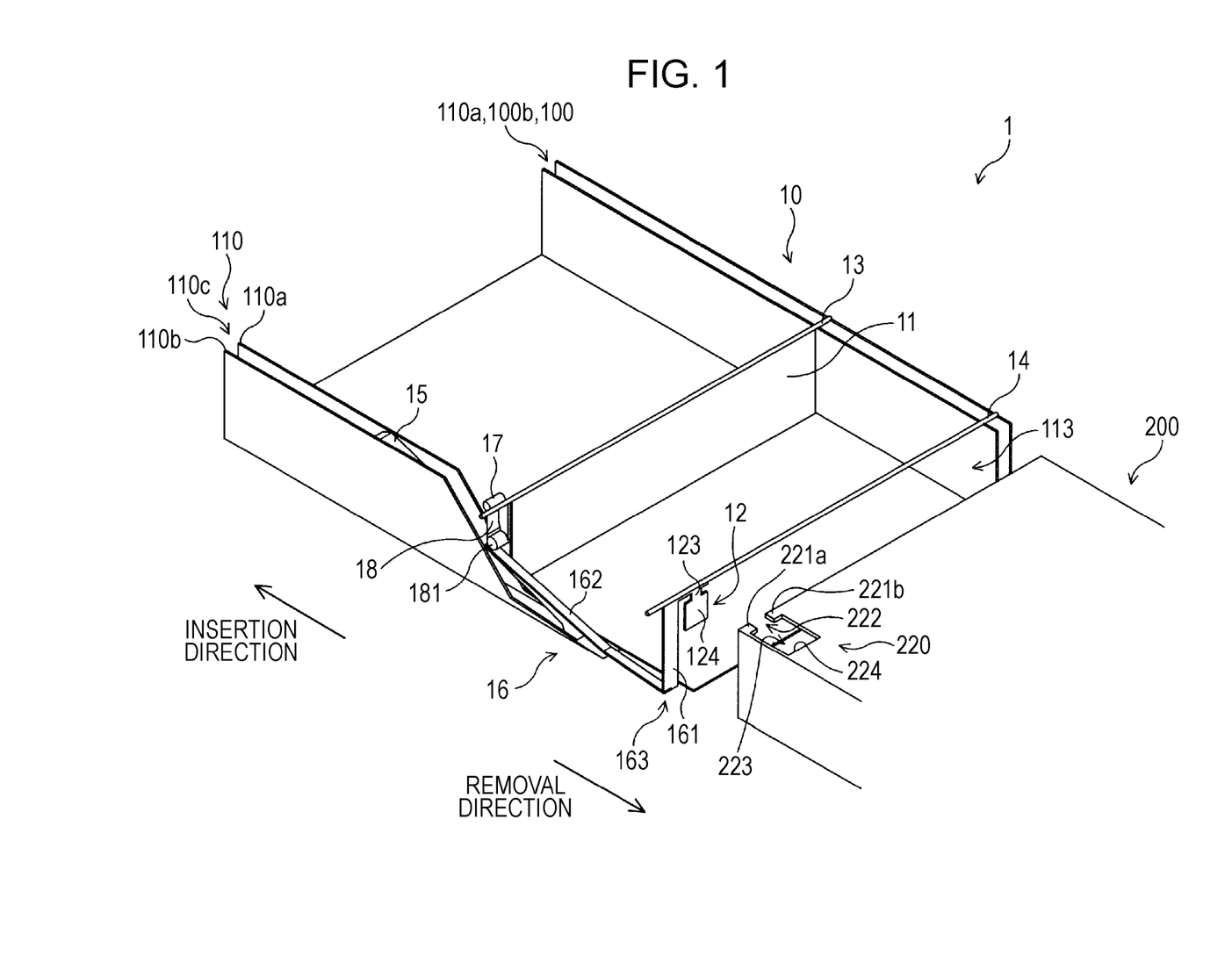
FIG. 1 is a perspective view that schematically illustrates a shutter unit as an example of an embodiment.
Figure 2:
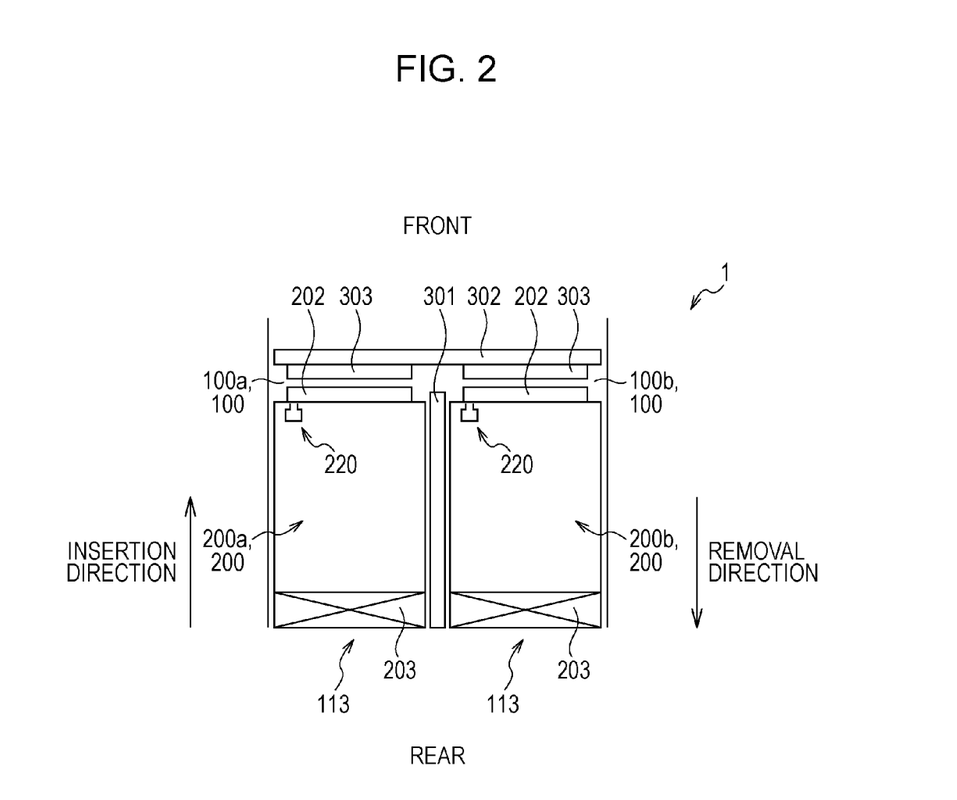
FIG. 2 is a transparent plan view that schematically illustrates, as an example of an embodiment, the states of the slots of a disk array apparatus that has the shutter unit.
Figure 3:
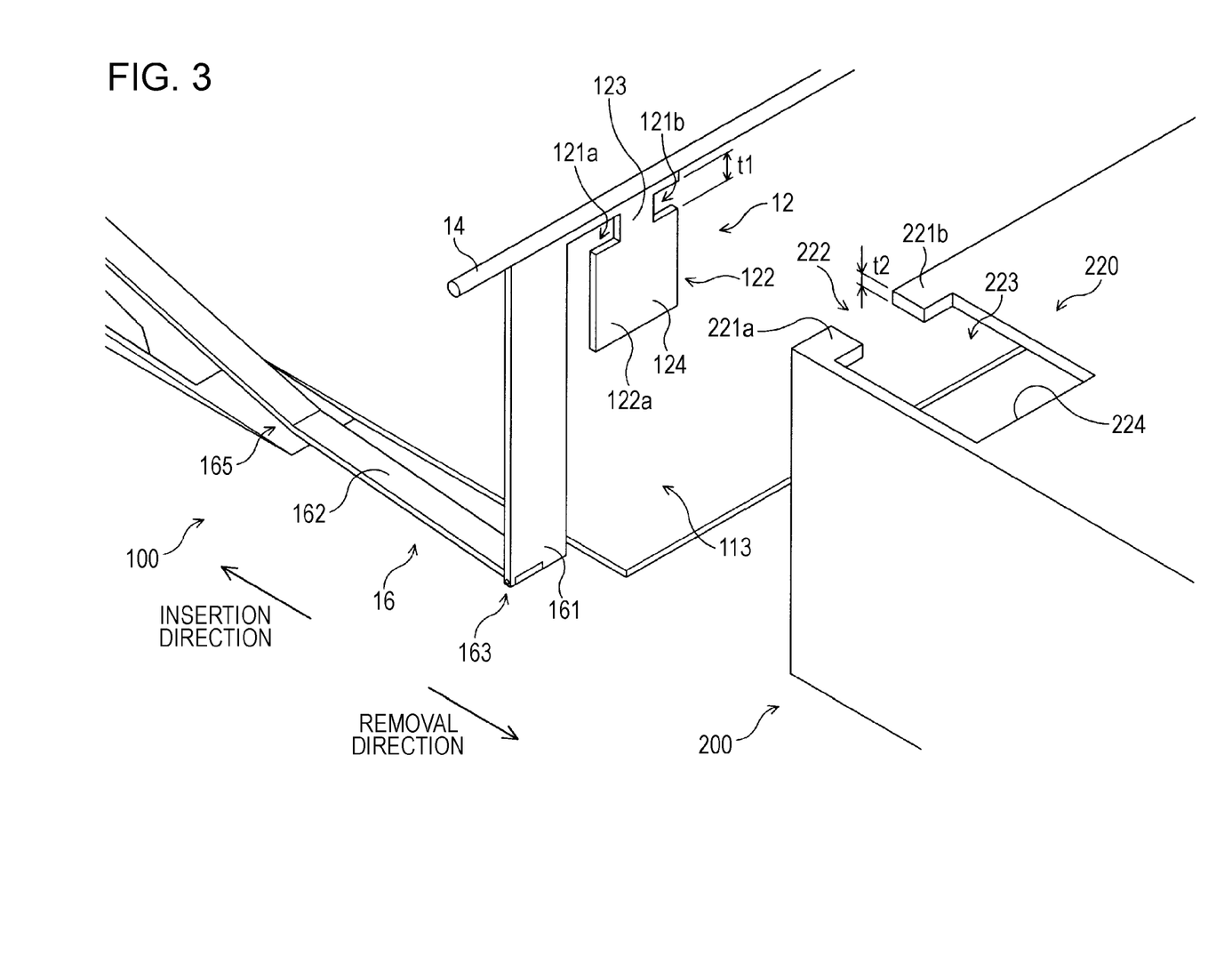
FIG. 3 is a partial perspective view that illustrates, as an example of an embodiment, the structures of an opening and closing key and a trap included in the shutter unit.

FIG. 1 is a perspective view that schematically illustrates a shutter unit (lid opening and closing device) 10 as an example of an embodiment. FIG. 2 is a transparent plan view that schematically illustrates, as an example of an embodiment, the states of the slots of a disk array apparatus (storage apparatus) 1 that has the shutter unit 10. FIG. 3 is a partial perspective view that illustrates, as an example of an embodiment, the structures of an opening and closing key 12 and a trap 220 included in the shutter unit 10. FIGS. 4A to 4D are side views used to describe, as an example of an embodiment, the operation of an interlocking arm 16 provided in the shutter unit 10.

The disk array apparatus 1, which is, for example, a server, has a plurality of slots (two slots in the example in FIG. 2) 100a and 100b as illustrated in FIG. 2. The disk array apparatus 1 is structured so that various modules (inserts) may be removably inserted into these slots 100a and 100b. That is, the disk array apparatus 1 is a storage apparatus that enables inserts to be inserted into the slots 100a and 100b. In this embodiment, an example will be described in which in the disk array apparatus 1, power supply units 200a and 200b are respectively inserted into the slots 100a and 100b.

In the disk array apparatus 1 illustrated in FIG. 2, the slots 100a and 100b are adjacently formed with a partition wall 301 disposed therebetween. In the example in FIG. 2, the shutter unit 10 is not illustrated.

In the example in FIG. 2, the power supply unit 200a is inserted through an opening 113 formed in the rear (on the lower side in FIG. 2) of the disk array apparatus 1 into the slot 100a and the power supply unit 200b is also inserted through another opening 113 formed in the rear into the slot 100b. The power supply unit 200a inserted into the slot 100a and the power supply unit 200b inserted into the slot 100b are connected to a back panel 302. Specifically, a connector 202 formed at one end of the power supply unit 200a is connected to a connector 303 formed on the back panel 302, and another connector 202 formed at one end of the power supply unit 200b is connected to another connector 303 formed on the back panel 302. Thus, the power supply units 200a and power supply unit 200b supply electric power to the disk array apparatus 1.

The slots 100a and 100b are similarly structured. In the descriptions below, when one of the slots 100a and 100b is desired to be identified, the reference characters 100a or 100b will be assigned to the slot. When an arbitrary slot is indicated, a reference numeral 100 will be assigned.

The power supply units 200a and 200b are similarly structured. In the descriptions below, when one of the power supply units 200a and 200b is desired to be identified, the reference characters 200a or 200b will be assigned to the power supply unit. When an arbitrary power supply unit is indicated, a reference numeral 200 will be assigned.

The power supply unit 200 includes an electric power supply device (not illustrated). When an operator or another person inserts the power supply unit 200 into the slot 100 of the disk array apparatus 1 and is connected to the back panel 302, electric power generated by the electric power supply device is supplied to the disk array apparatus 1. The electric power supply device is a heat-generating part that generates heats during electric power generation. To assure stable operation of the electric power supply device, it is desirable to cool the electric power supply device.

The power supply unit 200 has a case shaped like a rectangular parallelepiped, a cooling fan 203 being provided on one surface of the case as illustrated in FIG. 2. The cooling fan 203 has, for example, a plurality of blades (not illustrated) and a motor (not illustrated). When the motor drives the rotation of the blades, air flows and the heat-generating part (electric power supply device) in the power supply unit 200 is cooled.

Any of various known cooling units may be used as the cooling fan 203. For example, a sirocco fan and a propeller fan with a plurality of blades radially disposed may be used. The cooling fan 203 may be implemented in various forms.

A connector 202 that engages the connector 303 on the back panel 302 is provided on a surface of the power supply unit 200, the surface being opposite to the surface on which the cooling fan 203 is disposed.

The power supply unit 200 is oriented so that a side having the connector 202 faces the opening 113 and is then inserted through the opening 113 into the slot 100. The surface of the power supply unit 200 on which the connector 202 is disposed may be referred to below as the insertion surface. The direction in which the power supply unit 200 moves when the power supply unit 200 is inserted into the slot 100 is referred to below as the insertion direction. In the example in FIG. 2, the direction from the lower side on the drawing toward the upper side is the insertion direction. A direction opposite to the insertion direction is referred to below as the removal direction.

The trap 220, described later, is provided on a top plate, which forms the upper surface of the case of the power supply unit 200 in the vicinity of an end at which the connector 202 is disposed. For convenience, the case of the power supply unit 200 may be simply referred to below as the power supply unit 200.

In this embodiment, the cooling air generated by the cooling fan 203 passes through the back panel 302, flows into the power supply unit 200 from the insertion surface, passes through the power supply unit 200, and flows out of the cooling fan 203. That is, the cooling air generated by the cooling fan 203 flows in the removal direction described above.

The slot 100, which is a box that has a shape substantially similar to the shape of the power supply unit 200, internally stores the power supply unit 200. One plane (lower plane in FIG. 2) of the slot 100 is open as the opening 113, through which the power supply unit 200 is inserted and removed. The back panel 302 is disposed on a plane (upper plane in FIG. 2), in the slot 100, opposite to the opening 113. In each of the slots 100a and 100b, the connector 303 disposed on the back panel 302 is exposed. In the slot 100, the connector 202 of the inserted power supply unit 200 is connected to the connector 303.

A side wall 110, which is one of the side walls of the slot 100, is formed with two plate members, an inner wall 110a and an outer wall 110b, a clearance 110c being left between the inner wall 110a and the outer wall 110b, as shown in FIG. 1.

In the slot 100, the shutter unit 10 is disposed in the vicinity of the opening 113 so that the shutter unit 10 openably covers the interior of the slot 100 so as to define the interior.

As illustrated in FIG. 1, the shutter unit 10 includes a shutter (lid) 11, the opening and closing key 12, rotational axes 13 and 14, a guide slope (guide) 15, the interlocking arm (arm member) 16, a stopper 17, and a fin 18.

The guide slope 15 is formed in the clearance 110c between the inner wall 110a and the outer wall 110b described above as an inclined surface, the height of which is gradually increased toward the insertion direction from the opening 113. That is, the guide slope 15 is an included surface that extends in the insertion direction and has a height that is gradually increased from the opening 113 toward the back. A roller 164 disposed at an end of the interlocking arm 16 (second arm 162), described later, moves on the guide slope 15.

The shutter 11 is a plate-like lid, disposed in the slot 100, that openably covers the interior of the slot 100 at a particular position in the slot 100 in the insertion direction. The shutter 11 has a shape similar to the cross section of the slot 100 that is orthogonal to the insertion direction. One end of the shutter 11 is pivotally supported by the swingable rotational shaft (first supporting shaft) 13, which is orthogonal to the insertion direction of the slot 100, and extends in a horizontal direction. While the shutter 11 is vertically suspended from the rotational shaft 13, the shutter 11 covers the slot 100. The state in which the shutter 11 is vertically suspended from the rotational shaft 13 and faces downward will be referred to below as the closed state of the shutter 11. In the closed state, the clearances between the shutter 11 and the inner surfaces of the slot 100 (upper surface, lower surface, and two side surfaces) are lessened to suppress air from passing through these clearances. That is, in the closed state of the shutter 11, the shutter 11 divides the interior of the slot 100 in the insertion direction and removal direction. In this embodiment, members that pivotally support the rotational shaft 13 are not illustrated in FIG. 1.

The shutter 11 is structured so as to be swingable around the rotational shaft 13 from the vertically downward state toward the opening 113. The stopper 17, described later, suppresses the shutter 11 in the vertically downward state from swinging toward the insertion direction.

That is, the shutter 11 is structured so as to be swingable from the vertically downward state only in removable direction. Thus, while being vertically suspended from the rotational shaft 13, the shutter 11 covers the slot 100; even if the shutter 11 receives a wind pressure or another type of pressure in the insertion direction, the shutter 11 does not swing in the insertion direction. This suppresses the clearances between the shutter 11 and the inner surfaces of the slot 100 (upper surface, lower surface, and two side surfaces) from becoming large. In the closed stated of the shutter 11, therefore, it is ensured that the flowing of air in the insertion direction is suppressed.

The opening and closing key 12, which is disposed downstream of the shutter 11 in the removal direction, is a plate-like member that is pivotally supported by the rotational shaft (second supporting shaft) 14, which is parallel to the rotational shaft 13 described above, and is swingably suspended from the rotational shaft 14. When the power supply unit 200 is inserted through the opening 113 into the slot 100, the opening and closing key 12 is pressed by the power supply unit 200 in the insertion direction and swings around the rotational shaft 14. Members that pivotally support the rotational shaft 14 are also not illustrated in FIG. 1.

As illustrated in FIG. 3, the opening and closing key 12 has a rectangular engaging plate 122 linked to the rotational shaft 14. The engaging plate 122 has cutouts 121a and 121b in the vicinity of the rotational shaft 14, which are formed from both sides of the engaging plate 122 so that the dimension of the engaging plate 122 along the axial direction of the rotational shaft 14 is reduced. An area of the opening and closing key 12 that is present between the cutouts 121a and 121b and has a reduced dimension along the axial direction of the rotational shaft 14 will be referred to below as a passing plate 123. An area of the engaging plate 122 that is other than the passing plate 123 will be referred to below as a protruding plate 124. That is, it may be said that the opening and closing key 12 has the passing plate 123 and protruding plate 124 and the rotational shaft 14 and protruding plate 124 are connected through the passing plate 123 so as to be continuous.

A surface of the engaging plate 122 that faces in the removal direction with the engaging plate 122 suspended from the rotational shaft 14 will be referred to below as a front surface 122a. That is, the front surface 122a of the engaging plate 122 faces the power supply unit 200.

The vertical length of the passing plate 123, that is, the clearance t1 between the rotational shaft 14 and the protruding plate 124, is larger the thickness t2 of a top plate, described later, which forms the upper surface of the power supply unit 200. The length of the passing plate 123 along the axial direction of the rotational shaft 14 is smaller than the distance between protrusions 221a and 221b formed in the trap 220.

The protruding plate 124 is smaller in size than a cutout 223 described later, which is part of the trap 220 formed in the power supply unit 200. The length of the protruding plate 124 along the axial direction of the rotational shaft 14 is longer than the distance between the protrusions 221a and 221b of the trap 220.

The distance between the shutter 11 and the opening and closing key 12 in the insertion direction, that is, the distance between the rotational shaft 13 and the rotational shaft 14, is longer than at least the length of the shutter 11 from the rotational shaft 13 to another end thereof. When the power supply unit 200 is to be inserted, therefore the shutter 11 does not interfere with the power supply unit 200 until the shutter 11 swings in the removal direction and is fully opened.

The fin (lever member) 18, which is fixed to the shutter 11, is rotatable around the rotational shaft 13 in synchronization with the shutter 11. At the bottom of the fin 18, a roller 181 is provided that is pivotally supported parallel to the rotational shaft 13. The roller 181 is disposed on the second arm 162 of the interlocking arm 16 described later so as to movable on the second arm 162. A member having a low coefficient of friction, for example, may be provided at the bottom of the fin 18 so as to be slidable on the second arm 162, instead of the roller 181; a modification may be made appropriately.

Figure 4A:
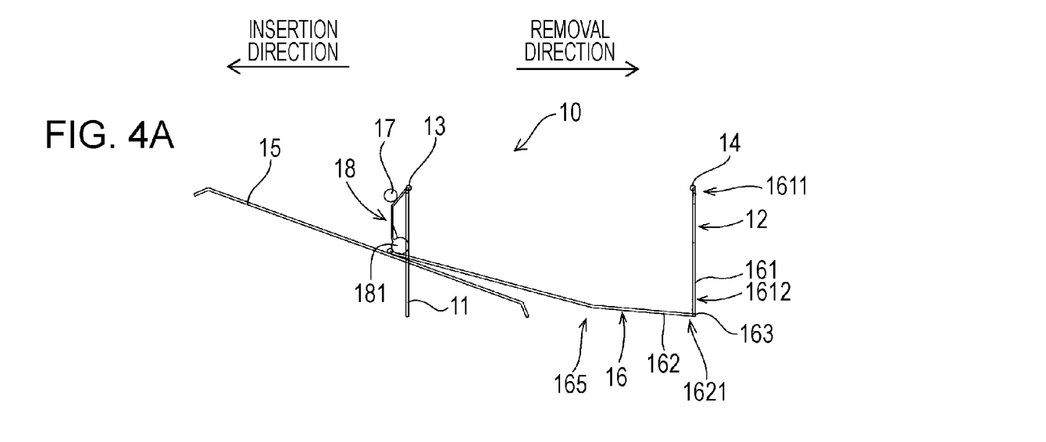
FIGS. 4A to 4D are side views used to describe, as an example of an embodiment, the operation of an interlocking arm provided in the shutter unit.

The stopper 17 is disposed at a position, upstream of the fin 18 in the insertion direction, at which the stopper 17 abuts the fin 18 with the shutter 11 facing vertically downward, as illustrated in FIG. 4A. This suppresses the fin 18 from moving in the insertion direction at that position. Thus, the stopper 17 suppresses the shutter 11 facing vertically downward from swinging in the insertion direction.

The interlocking arm (arm member) 16 is formed by linking the first arm (linking member) 161 and second arm (linking member) 162 with a hinge 163. A first end (upper end) 1611 of the first arm 161, which is secured to the opening and closing key 12, is rotatable around the rotational shaft 14 in synchronization with the opening and closing key 12. A second end (lower end) 1612 of the first arm 161 is connected to a first end 1621 of the second arm 162 through the hinge 163. The roller 164 is disposed at a second end of the second arm 162. The roller 164 is placed on the guide slope 15 so as to movable on the guide slope 15. A member having a low coefficient of friction, for example, may be provided at the second end of the second arm 162 so as to be slidable on the guide slope 15, instead of the roller 164; a modification may be made appropriately.

The interlocking arm 16, formed by hinging the first arm 161 and second arm 162, is secured to the opening and closing key 12 at a first end. A second end of the interlocking arm 16 moves on the inclined surface of the guide slope 15 in synchronization with the swinging of the opening and closing key 12.

Figure 4B:
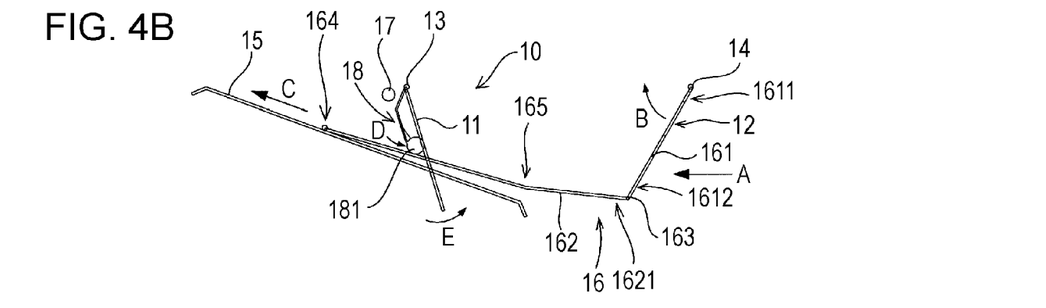
Figure 4C:
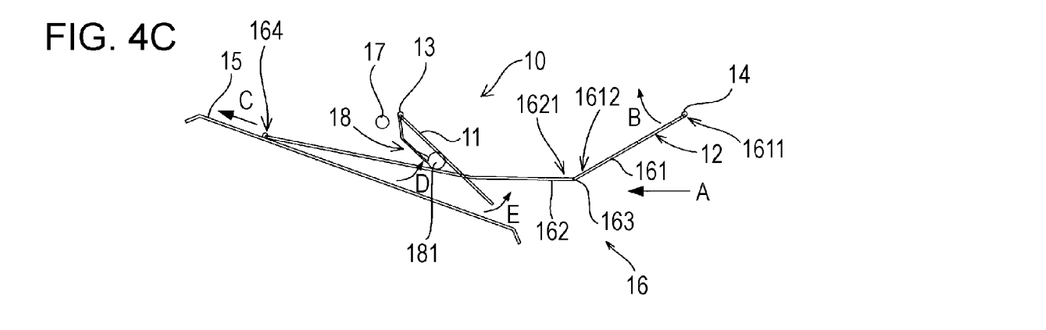
Figure 4D:
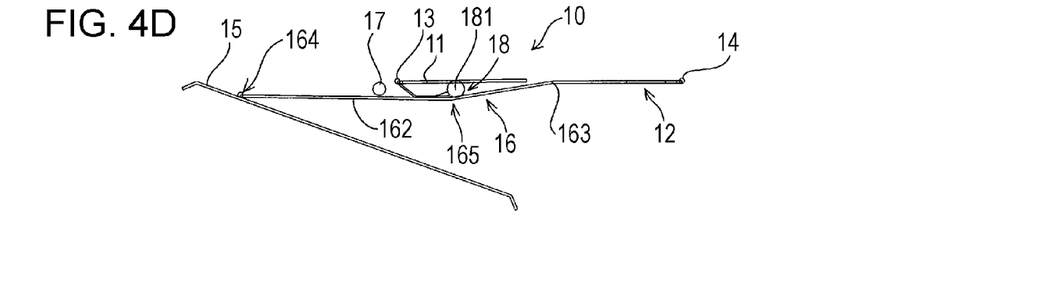

The operations of the interlocking arm 16, fin 18, and shutter 11 will be described with reference to FIGS. 4A to 4D. FIG. 4A illustrates the shutter 11 in the closed state, FIGS. 4B and 4C illustrate processes to open the shutter 11, and FIG. 4D illustrates the shutter 11 in the open state. In FIGS. 4A to 4D, the power supply unit 200 is not illustrated.

In a state in which the power supply unit 200 is not inserted into the slot 100, the opening and closing key 12 and shutter 11 face vertically downward as illustrated in FIG. 4A, indicating the fully closed state.

When the operator slightly inserts the power supply unit 200 from the opening 113 of the slot 100 as illustrated in FIG. 4B in the insertion direction (see arrow A), an edge 224 of the trap 220 of the power supply unit 200 presses the front surface 122a of the opening and closing key 12 in the insertion direction. This causes the opening and closing key 12 to swing around the rotational shaft 14 (see arrow B). The first arm 161 also swings accordingly and its lower end 1612 moves in the insertion direction.

When the lower end 1612 of the first arm 161 moves, the second arm 162 hinged to the first arm 161 also moves in the insertion direction. Thus, the roller 164 of the second arm 162 moves on the guide slope 15 and rises (see arrow C). The first end 1621 of the second arm 162 is lifted together with the lower end 1612 of the first arm 161. Therefore, the entire second arm 162 is lifted.

When the second arm 162 is lifted, the roller 181 of the fin 18 on the second arm 162 is also lifted accordingly. Since the second arm 162 inclines so that the side near the opening 113 is lowered and the stopper 17 suppresses the fin 18 from moving in the insertion direction, the roller 181 of the fin 18 moves toward the opening 113. Therefore, the fin 18 swings around the rotational shaft 13 in the removal direction (see arrow D), and the shutter 11, to which the fin 18 is secured, also swing around the rotational shaft 13 (see arrow E). That is, the shutter 11 opens toward the opening 113 so as to lift its lower end.

When the operator further moves the power supply unit 200 through the opening 113 in the insertion direction, the opening and closing key 12 further swings around the rotational shaft 14 as illustrated in FIG. 4C (see arrow B). The lower end 1612 of the first arm 161 also moves in the insertion direction accordingly.

When the lower end 1612 of the first arm 161 moves, the second arm 162 hinged to the first arm 161 also further moves in the insertion direction. Thus, the roller 164 of the second arm 162 further moves on the guide slope 15 and rises (see arrow C). The first end 1621 of the second arm 162 is lifted together with the lower end 1612 of the first arm 161. Therefore, the entire second arm 162 further is lifted.

When the second arm 162 further is lifted, the roller 181 of the fin 18 on the second arm 162 is also further lifted. The fin 18 further swings around the rotational shaft 13 in the removal direction (see arrow D) and the shutter 11, to which the fin 18 is secured, also further swings around the rotational shaft 13 in the removal direction (see arrow E).

When the opening and closing key 12 is then oriented substantially horizontally as illustrated in FIG. 4D, the first arm 161 and second arm 162 of the interlocking arm 16 also become horizontal, placing the shutter 11 in the fully open state. A bend 165 is formed at a position at which the second arm 162 oriented horizontally faces the fin 18, so that the second arm 162 protrudes downward. Therefore, the second arm 162 does not interfere with the stopper 17 or the fin 18.

The trap 220 is formed in the upper surface of the power supply unit 200 in the vicinity of the end at which the connector 202 is disposed.

As illustrated in FIG. 3, the trap 220 has the cutout 223 in the top plate, which forms the upper surface of the power supply unit 200, at a position, in the vicinity of the end in the insertion direction, at which the trap 220 faces the opening and closing key 12. The cutout 223 has a shape similar to and larger than the shape of the opening and closing key 12. The trap 220 also has a pair of opposing protrusions 221a and 221b in the horizontal direction orthogonal to the insertion direction at the end in the insertion direction. The protrusions 221a and 221b are formed to reduce the distance of the cutout 223 in the horizontal direction orthogonal to the insertion direction at the end of the cutout 223 in the insertion direction. The clearance between the protrusions 221a and 221b is denoted by the reference numeral 222. As described above, the thickness t2 of the top plate forming the upper surface of the power supply unit 200 is smaller than the clearance t1, described above, between the rotational shaft 14 and the protruding plate 124 at the opening and closing key 12.

When inserting the power supply unit 200 into the slot 100, the operator orients the power supply unit 200 so that the side on which the trap 220 is formed faces the opening 113 of the slot 100 and moves the power supply unit 200 in the insertion direction. The passing plate 123 of the opening and closing key 12 of the shutter unit 10 relatively passes the clearance 222 in the trap 220 during the insertion. Since the thickness t2 of the protrusions 221a and 221b is smaller than the clearance t1 between the rotational shaft 14 and the protruding plate 124 at the opening and closing key 12, no interference occurs between the opening and closing key 12 and the protrusions 221a and 221b.

However, it is desirable to minimize the difference between the clearance t1 and the thickness t2 of the top plate. With the opening and closing key 12 facing vertically downward, no interference occurs between the opening and closing key 12 and the protrusions 221a and 221b. When the opening and closing key 12 swings and inclines, however, the protrusions 221a and 221b interfere with the protruding plate 124 of the opening and closing key 12, suppressing the protrusions 221a and 221b from passing through the clearance between the rotational shaft 14 and the protruding plate 124.

When the operator further moves the power supply unit 200 in the insertion direction, the opening and closing key 12 (passing plate 123) abuts the edge 224 of the cutout 223, the edge 224 being at the far end of the trap 220 in the removal direction. When the operator further moves the power supply unit 200 in the insertion direction, the edge 224 presses the opening and closing key 12 in the insertion direction, causing the opening and closing key 12 to swing around the rotational shaft 14.

When the operator further moves the power supply unit 200 in the insertion direction and the edge 224 is positioned below the rotational shaft 14, the engaging plate 122 of the opening and closing key 12 upwardly exits from the cutout 223 and becomes substantially horizontal. That is, the engaging plate 122 of the opening and closing key 12 becomes horizontal with the front surface 122a facing the upper surface of the power supply unit 200. When the operator further moves the power supply unit 200 in the insertion direction, the engaging plate 122 of the opening and closing key 12 remains horizontal downstream of the trap 220 in the removal direction.

To remove the power supply unit 200 from the slot 100, the operator moves the power supply unit 200 in the removal direction. When the cutout 223 of the trap 220 is positioned below the opening and closing key 12 during the removal of the power supply unit 200, the opening and closing key 12 is inclined by the shutter 11 or due to the own weight of the opening and closing key 12. That is, the opening and closing key 12 drops into the cutout 223 of the trap 220.

When the operator moves the power supply unit 200 in this state in the removal direction, the protrusions 221a and 221b of the trap 220 interfere with the protruding plate 124 of the opening and closing key 12. That is, the protruding plate 124 of the opening and closing key 12 is placed on the protrusions 221a and 221b of the trap 220. When the operator further moves the power supply unit 200 in the removal direction with the opening and closing key 12 placed on the protrusions 221a and 221b of the trap 220, the protrusions 221a and 221b cause the opening and closing key 12 to swing in the removal direction.

When the operator further moves the power supply unit 200 in the removal direction and the opening and closing key 12 faces vertically downward, the protrusions 221a and 221b become ready to pass through the clearance between the rotational shaft 14 and the protruding plate 124 at the opening and closing key 12 and the opening and closing key 12 is disengaged from the trap 220.

Figure 5A:
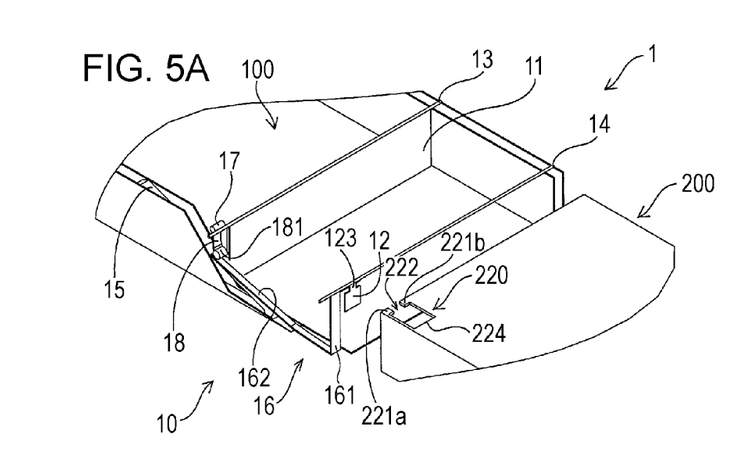
FIGS. 5A to 5D are partial perspective views used to describe, as an example of an embodiment, the opening operation of the shutter unit as an example of an embodiment.
Figure 5B:
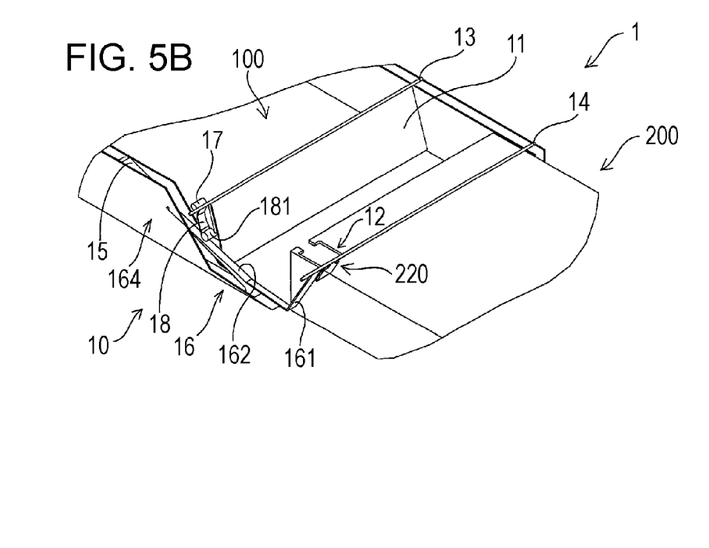
Figure 5C:
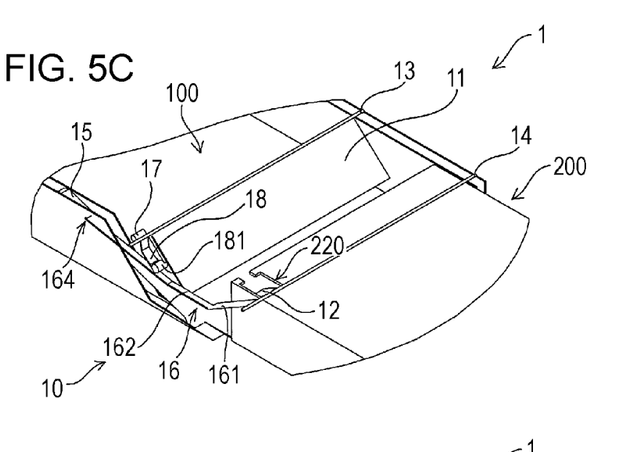
Figure 5D:
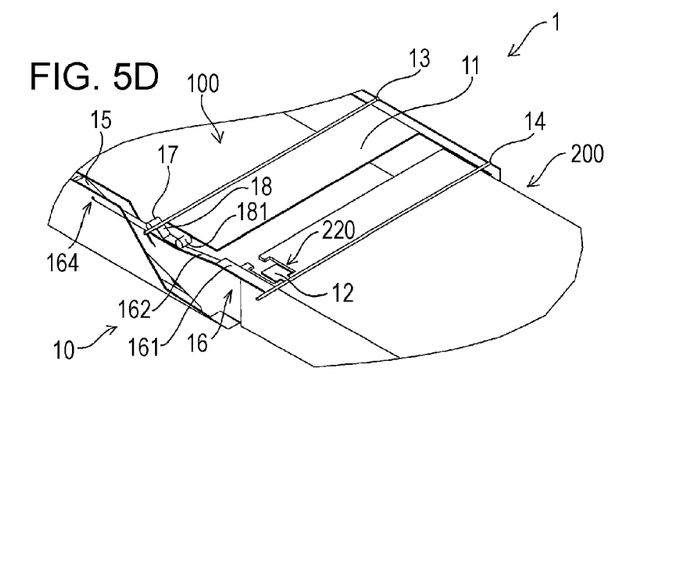

As for the disk array apparatus 1, structured as described above, which has the shutter unit 10 as an example of an embodiment, operations at the insertion of the power supply unit 200 into the slot 100 will be described with reference to FIGS. 5A to 5D and FIGS. 6A to 6D. FIGS. 5A to 5D are partial perspective views used to describe the opening operation of the shutter unit 10 as an example of an embodiment. FIG. 5A illustrates the shutter 11 in the closed state. FIGS. 5B and 5C illustrate processes to open the shutter 11. FIG. 5D illustrates the shutter 11 in the open state. FIGS. 6A to 6D are side views that respectively correspond to FIGS. 5A to 5D.

For convenience, some components including the interlocking arm 16 and opening and closing key 12 are drawn so as to be visible in FIGS. 5A to 5D and FIGS. 6A to 6D.

Figure 6A:
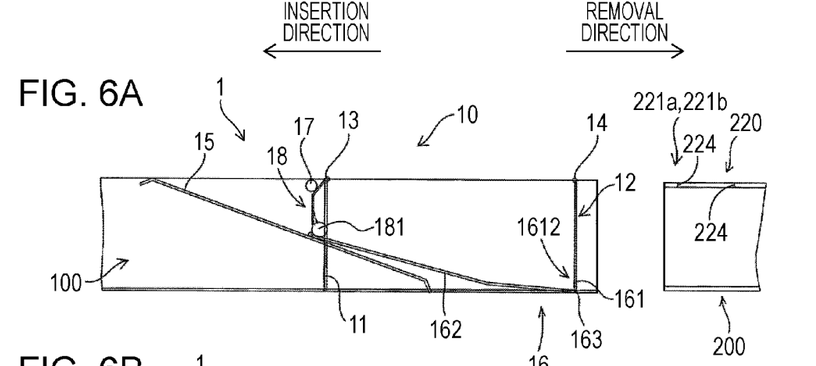
FIGS. 6A to 6D are side views used to describe, as an example of an embodiment, the opening operation of the shutter unit.

In a state in which the power supply unit 200 is not inserted into the slot 100, the opening and closing key 12 and shutter 11 face vertically downward as illustrated in FIG. 5A and FIG. 6A, suppressing air and other obstacles from entering the slot 100. The stopper 17 also suppresses the fin 18 from swinging in the insertion direction. Thus, even if, for example, air exhausted from a power supply unit 200 inserted into the adjacent slot 100 enters the slot 100 and presses the shutter 11 in the insertion direction, the shutter 11 does not swing in the insertion direction. Accordingly, the shutter 11v reliably suppresses the entrance of, for example, air exhausted from another power supply unit 200 into the slot 100. That is, the cooling efficiency of the disk array apparatus 1 is not reduced.

Figure 6B:
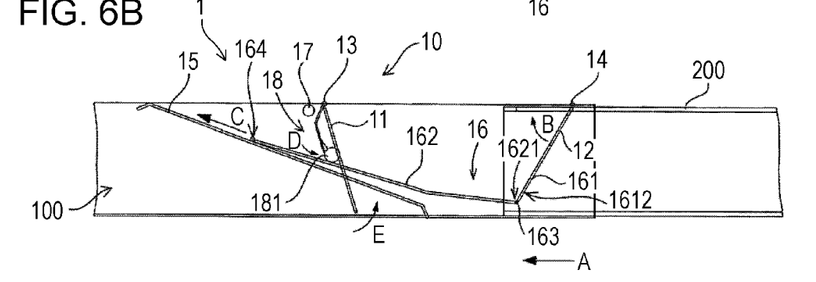

Next, as illustrated in FIGS. 5B and 6B, the operator slightly inserts the power supply unit 200 through the opening 113 of the slot 100 (see arrow A in FIG. 6B).

The passing plate 123 of the opening and closing key 12, which faces vertically downward, relatively passes through the clearance 222 of the trap 220 during the insertion. When the operator further moves the power supply unit 200 in the insertion direction, the opening and closing key 12 (passing plate 123) abuts the edge 224 of the cutout 223. When the operator further moves the power supply unit 200 in the insertion direction, the edge 224 presses the opening and closing key 12 in the insertion direction, causing the opening and closing key 12 to swing in the insertion direction (see arrow B in FIG. 6B). Due to this swinging, the first arm 161 also swings and its lower end 1612 moves in the insertion direction.

When the lower end 1612 of the first arm 161 moves, the second arm 162 hinged to the first arm 161 also moves in the insertion direction. Thus, the roller 164 of the second arm 162 moves on the guide slope 15 in the insertion direction (see arrow C in FIG. 6B). The first end 1621 of the second arm 162 is lifted together with the lower end 1612 of the first arm 161. Thus, the entire second arm 162 is lifted.

When the second arm 162 is lifted, the roller 181, placed on the second arm 162, of the fin 18, is also lifted by being pressed by the second arm 162. Since the second arm 162 inclines so that the end near the opening 113 is lowered and the stopper 17 suppresses the fin 18 from moving in the insertion direction, the roller 181 of the fin 18 moves in the removal direction. Therefore, the fin 18 swings around the rotational shaft 13 in the removal direction (see arrow D in FIG. 6B), the shutter 11, to which the fin 18 is secured, also swings around the rotational shaft 13 in the removal direction (see arrow E in FIG. 6B). That is, the shutter 11 opens toward the opening 113 so as to lift the lower end.

Figure 6C:
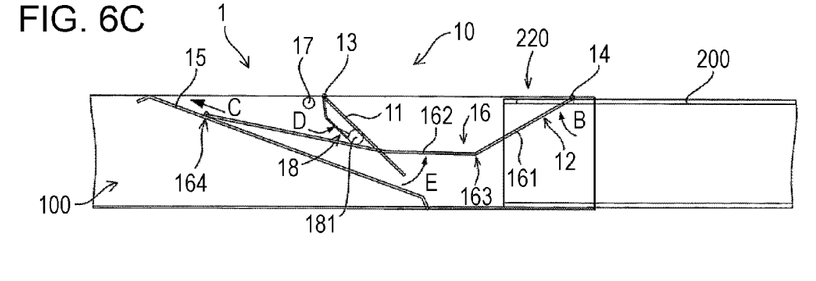

When the operator further moves the power supply unit 200 through the opening 113 in the insertion direction as illustrated in FIG. 5C and FIG. 6C, the edge 224 of the trap 220 causes the opening and closing key 12 to swing in the insertion direction. When the opening and closing key 12 further swings around the rotational shaft 14 (see arrow B in FIG. 6C), the lower end 1612 of the first arm 161 further moves in the insertion direction.

When the lower end 1612 of the first arm 161 moves in the insertion direction, the second arm 162 hinged to the first arm 161 also further moves in the insertion direction. Thus, the roller 164 of the second arm 162 moves on the guide slope 15 in the insertion direction and is further lifted (see arrow C in FIG. 6C). The first end 1621 of the second arm 162 is further lifted together with the lower end 1612 of the first arm 161. Thus, the entire second arm 162 is lifted.

When the second arm 162 is lifted, the roller 181, on the second arm 162, of the fin 18 is also lifted. That is, the fin 18 further swings around the rotational shaft 13 in the removal direction (see arrow D in FIG. 6C) and the shutter 11 also further swings around the rotational shaft 13 in the removal direction in synchronization with the fin 18 (see arrow E in FIG. 6C).

Figure 6D:
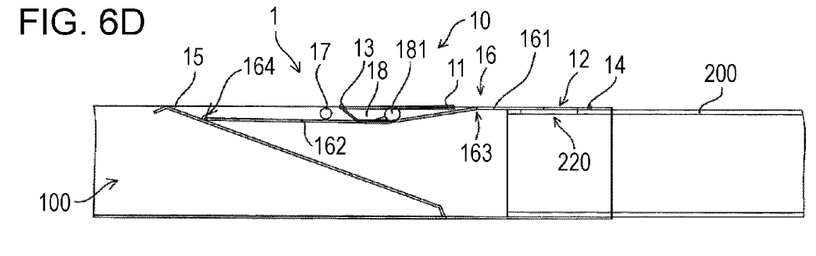

When the opening and closing key 12 is then oriented substantially horizontally as illustrated in FIG. 5D and FIG. 6D, the first arm 161 and second arm 162 of the interlocking arm 16 also become substantially horizontal, placing the shutter 11 in the fully open state. Accordingly, the connector 202 of the power supply unit 200 may be connected to the connector 303 on the back panel without the shutter 11 suppressing the insertion of the power supply unit 200.

When the shutter 11 is in the fully open state as illustrated in FIG. 5D and FIG. 6D, the engaging plate 122 of the opening and closing key 12 is also oriented substantially horizontally, so the engaging plate 122 upwardly exits from the cutout 223 of the trap 220. Accordingly, the opening and closing key 12 does not also suppress the insertion of the power supply unit 200.

Figure 7A:
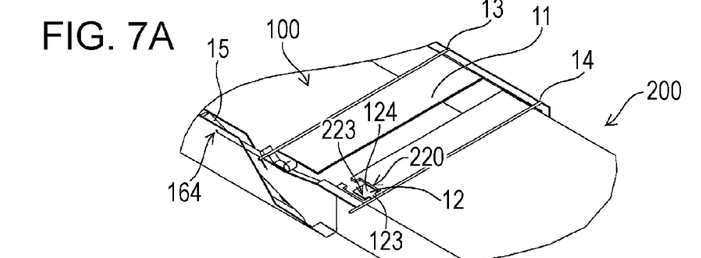
FIGS. 7A to 7E are perspective views used to describe, as an example of an embodiment, the closing operation of the shutter unit.
Figure 7B:
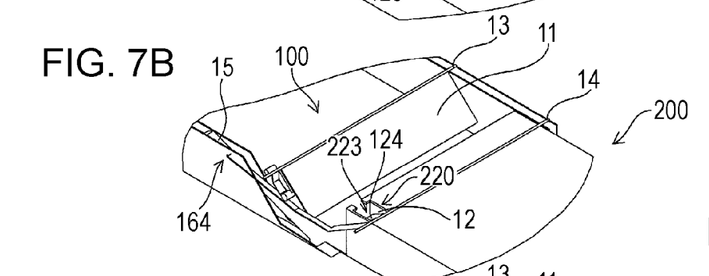
Figure 7C:
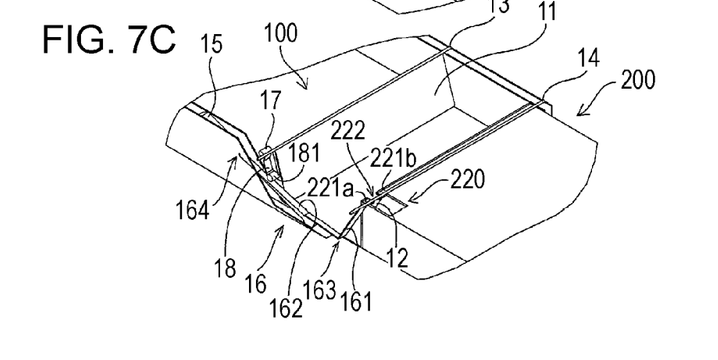
Figure 7D:
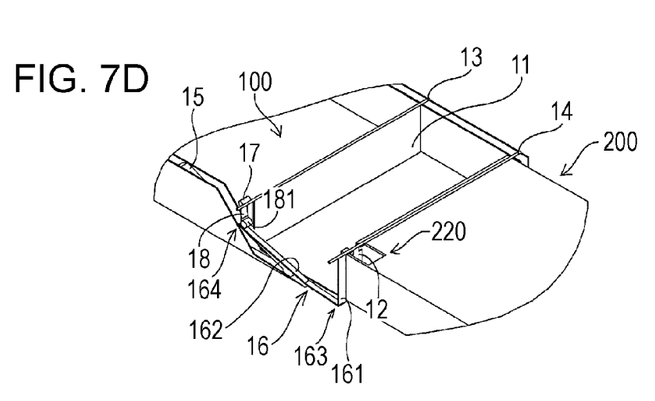
Figure 7E:
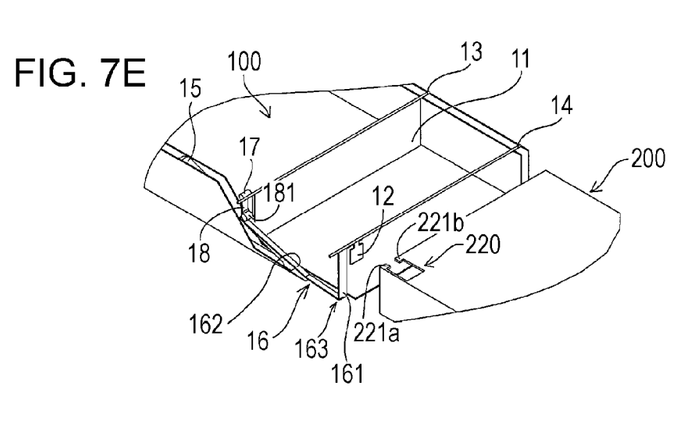

Next, as for the disk array apparatus 1 having the shutter unit 10 as an example of an embodiment, operations at the removal of the power supply unit 200 from the slot 100 will be described with reference to FIGS. 7A to 7E. FIGS. 7A to 7E are perspective views used to describe, as an example of an embodiment, the closing operation of the shutter unit 10. FIG. 7A illustrates the shutter 11 in the closed state. FIGS. 7B and 7C illustrate processes to close the shutter 11. FIG. 7D illustrates the shutter 11 in the closed state. FIG. 7E illustrates a state in which the power supply unit 200 has been removed from the slot 100. For convenience, some components including the interlocking arm 16 are drawn so as to be visible in FIGS. 7A to 7E.

To remove the power supply unit 200 from the slot 100 through the opening 113, the operator or another person moves the power supply unit 200 in the removal direction.

The example in FIG. 7A illustrates a state after the end of the power supply unit 200 on the same side as the trap 220 has passed below the shutter 11 and immediately before the end passes below the opening and closing key 12.

In the state in FIG. 7A, the passing plate 123 of the opening and closing key 12 is on the top plate of the power supply unit 200 and the protruding plate 124 of the opening and closing key 12 is placed ahead of the cutout 223 in the removal direction and is parallel, on the top plate of the power supply unit 200, to the top plate. That is, the passing plate 123 of the opening and closing key 12 is supported on the top plate of the power supply unit 200 and the opening and closing key 12 and shutter 11 are maintained horizontally, that is, in the fully open state.

When the operator further moves the power supply unit 200 placed in the state illustrated in FIG. 7A in the removal direction, the passing plate 123 of the opening and closing key 12 comes off the top plate of the power supply unit 200. That is, as illustrated in FIG. 7B, the end of the shutter 11 at which the shutter 11 is not pivotally supported swings so as to move downwardly due to its own weight. In the example in FIG. 7B, however, the shutter 11 does not reach the vertically suspended state (fully closed state) due to the frictional resistances of the rotational axes 13 and 14, the interlocking arm 16, and other movable components and to other factors, but is inclined in the removal direction.

The protruding plate 124 of the opening and closing key 12 drops into the cutout 223 of the trap 220 in synchronization with the swinging of the shutter 11. In the state illustrated in FIG. 7B, the opening and closing key 12 does not reach the vertically suspended state but is inclined in the insertion direction.

When the operator further moves the power supply unit 200 in the removal direction, the opening and closing key 12 moves in the cutout 223 of the trap 220 toward the protrusions 221a and 221b, as illustrated in FIG. 7C. Since the opening and closing key 12 is inclined so as to lower in the removal direction, however, it is difficult for the protrusions 221a and 221b to pass through the clearance between the rotational shaft 14 and the protruding plate 124 at the opening and closing key 12. As a result, the protruding plate 124 of the opening and closing key 12 abuts the protrusions 221a and 221b of the trap 220. That is, the opening and closing key 12 engages the protrusions 221a and 221b of the trap 220.

When the operator further moves the power supply unit 200 placed in this state in the removal direction, the protrusions 221a and 221b of the trap 220 presses the protruding plate 124 of the opening and closing key 12 in the removal direction, causing the opening and closing key 12 to swing in the removal direction.

The first arm 161 also swings in synchronization with the swing of the opening and closing key 12, moving its lower end 1612 in the removal direction. When the lower end 1612 of the first arm 161 moves, the second arm 162 hinged to the first arm 161 also moves in the removal direction. Thus, the roller 164 of the second arm 162 moves on the guide slope 15 in the removal direction and lowers, and the first end 1621 of the second arm 162 is lowered together with the lower end 1612 of the first arm 161. Thus, the entire second arm 162 is lowered.

When the second arm 162 is lowered, the roller 181, on the second arm 162, of the fine 18 is also lowered together with the second arm 162. Accordingly, the fin 18 swings around the rotational shaft 13 in the insertion direction and the shutter 11, to which the fin 18 is secured, also swings around the rotational shaft 13 in the insertion direction. That is, the shutter 11 is closed in the insertion direction so as to lower its lower end.

When the opening and closing key 12 swings in the removal direction and the opening and closing key 12 faces vertically downward as illustrated in FIG. 7D, the protrusions 221a and 221b of the trap 220 become ready to pass through the clearance between the rotational shaft 14 and the protruding plate 124 at the opening and closing key 12. That is, the opening and closing key 12 is disengaged from the trap 220.

In this state, the shutter 11 also faces vertically downward, completely blocking the slot 100 and suppressing air and other obstacles from entering the slot 100.

When the operator further moves the power supply unit 200 in the removal direction with the opening and closing key 12 facing vertically downward as the result of swinging, therefore, the protrusions 221a and 221b of the trap 220 pass through the clearance between the rotational shaft 14 and the protruding plate 124 at the opening and closing key 12, as illustrated in FIG. 7E. This completes the removal of power supply unit 200 from the slot 100.

Even after the power supply unit 200 has been removed from the slot 100, the shutter 11 completely blocks the slot 100, suppressing air and other obstacles from entering the slot 100. Even if a wind pressure is applied to the shutter 11 in the insertion direction, the stopper 17 suppresses the shutter 11 from swinging in the insertion direction, suppressing air and other obstacles from entering the slot 100.

With the shutter unit 10 described as an example in an embodiment, when the power supply unit 200 is not present in the slot 100, the shutter 11 is vertically suspended from the rotational shaft 13 and blocks the slot 100. Thus, it is possible to reliably suppress air exhausted by the cooling fan 203 of another power supply unit 200 from entering the slot 100. Thus, the cooling efficiency may be improved.

In the example illustrated in FIG. 2, for example, when the power supply unit 200a is removed from the slot 100a during the active replacement of the power supply unit 200a inserted into the slot 100a, the shutter unit 10 may suppress air exhausted from the power supply unit 200b from entering into the slot 100a. Therefore, the cooling efficiency of the disk array apparatus 1 is not lowered during active replacement.

The shutter 11 is structured so as to swing in the removal direction and the stopper 17 suppresses the shutter 11 facing vertically download, that is, in the fully closed state, from moving in the insertion direction. Even if the shutter 11 is pressed in the insertion direction by, for example, a window pressure, therefore, the shutter 11 does not swing in the insertion direction and thereby a clearance or the like, which would otherwise be caused by the swinging of the shutter 11 in the insertion direction, is not formed. It is possible to reliably suppress air and other obstacles from entering the slot 100 and to improve the degree of shielding. Specifically, it is possible to reliably suppress air exhausted by the cooling fan 203 of another power supply unit 200 from entering the slot 100.

Furthermore, when the edge 224 of the trap 220 presses the opening and closing key 12 in the insertion direction at the insertion of the power supply unit 200 into the slot 100, the shutter 11 opens. That is, the shutter 11 automatically opens in synchronization with the insertion of the power supply unit 200. Thus, the connector 202 of the power supply unit 200 does not come into contact with the shutter 11 and the like at the insertion of the power supply unit 200, so any physical load is not applied to the connector 202. Accordingly, the failure ratios of the connector 202 and the like are lowered, improving reliability.

As for the shutter unit 10, the shutter 11 may be opened and closed without using an elastic member such as a spring. Since the shutter unit 10 may be structured without using an elastic member, the adjustment of the repulsive force of the elastic member and its aged deterioration are excluded from consideration. This enables costs of design, manufacturing, and maintenance to be reduced.

The technology in the present disclosure is not limited to the embodiments described above. Many variations are possible without departing from the intended scope of these embodiments.

For example, in the embodiments described above, two adjacent slots 100a and 100b have been provided in the disk array apparatus 1 as an example, but this is not a limitation. For example, three or more slots 100 may be provided. In addition, these slots 100 may be arranged vertically or horizontally.

In the embodiments described above, the disk array apparatus 1 has been described as an example of a storage apparatus, but this is not a limitation. For example, the disk array apparatus 1 may be a server computer or another electronic apparatus.

In the embodiments described above, the power supply unit 200 has been described as an example of an insert to be stored in the slot 100, but this is not a limitation. For example, a storage unit, a processor unit, and other various units may be used.

In the embodiments described above, the side wall 110 has not been formed in the vicinity of the interlocking arm 16 and fin 18 as illustrated in, for example, FIG. 1, and the fin 18 and interlocking arm 16 have been exposed as an example, but this is not a limitation. At least part of the interlocking arm 16 and fin 18 may be enclosed in the clearance 110c between the inner wall 110a and the outer wall 110b.

Due to the disclosure described above, the embodiments described above may be practiced and manufactured by those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A lid opening and closing device that opens and closes a lid that covers a box having an opening through which an insert is inserted, the device comprising:
    a first supporting shaft that extends horizontally and perpendicular to an insertion direction in which the insert is inserted, the first supporting shaft pivotally supporting one end of the lid, the lid being swingably suspended from the first supporting shaft;
    a guide surface, extending along the insertion direction, a height of which is gradually increased from the opening in the insertion direction;
    a second supporting shaft parallel to the first supporting shaft, the second supporting shaft being disposed nearer to the opening than the lid in the insertion direction;
    an opening and closing key being pivotally supported by the second supporting shaft and being swingably suspended from the second supporting shaft;
    an arm member, a first end of which is secured to the opening and closing key and a second end of which moves on the guide surface in synchronization with swinging of the opening and closing key; and
    a lever member, secured to the lid, that swings around the first supporting shaft together with the lid, one end of the lever member being disposed on an upper surface of the arm member, wherein
    when the insert is not present in the box, the lid is suspended from the first supporting shaft and covers the box and enters a closed state, and
    when the insert is inserted into the box through the opening, the insert causes the opening and closing key to swing in the insertion direction, the second end of the arm member rises along the guide surface in synchronization with the swinging of the opening and closing key, the risen arm member lifts the one end of the lever member, and the lid, to which the lever member is secured, swings around the first supporting shaft and enters an open state.

2. The lid opening and closing device according to claim 1, wherein when the insert is moved in a removal direction, which is opposite to the insertion direction, so as to be removed from the box, the opening and closing key engages the insert and swings in the insertion direction, the second end of the arm member lowers along the guide surface in synchronization with the swinging of the opening and closing key, the one end of the lever member lowers in synchronization with the lowering of the arm member, and the lid, to which the arm member is secured, swings around the first supporting shaft and enters a closed state.

3. The lid opening and closing device according to claim 1, further comprising a suppressing member that suppress the lid in the closed state from swinging in the insertion direction.

4. A storage apparatus, comprising:
a box having an opening through which an insert is inserted;
a first supporting shaft that extends horizontally and perpendicular to an insertion direction in which the insert is inserted;
a lid that is openable and closable, one end of the lid being pivotally supported to the first supporting shaft, the lid closing the box while being swingably suspended from the first supporting shaft;
a guide surface, extending along the insertion direction, a height of which is gradually increased from the opening in the insertion direction;
a second supporting shaft parallel to the first supporting shaft;
an opening and closing key provided nearer to the opening than the lid in the insertion direction, the opening and closing key being pivotally supported by the second supporting shaft and being swingably suspended from the second supporting shaft;
an arm member, a first end of which is secured to the opening and closing key and a second end of which moves on the guide surface in synchronization with swinging of the opening and closing key; and
a lever member, secured to the lid, that swings around the first supporting shaft together with the lid, one end of the lever member being disposed on an upper surface of the arm member; wherein
when the insert is not present in the box, the lid is suspended from the first supporting shaft and covers the box to place the box in a closed state, and
when the insert is inserted into the box through the opening, the insert causes the opening and closing key to swing in the insertion direction, the second end of the arm member rises along the guide surface in synchronization with the swinging of the opening and closing key, the risen arm member lifts the one end of the lever member, and the lid, to which the lever member is secured, swings around the first supporting shaft and enters an open state.

5. The storage apparatus according to claim 4,
wherein when the insert is moved in a removal direction, which is opposite to the insertion direction, so as to be removed from the box, the opening and closing key engages the insert and swings in the insertion direction, the second end of the arm member lowers along the guide surface in synchronization with the swinging of the opening and closing key, the one end of the lever member lowers in synchronization with the lowering of the arm member, and the lid, to which the arm member is secured, swings around the first supporting shaft and enters a closed state.

6. The storage apparatus according to claim 4, further comprising
a suppressing member that suppress the lid in the closed state from swinging in the insertion direction.

* * * * *